(12) United States Patent
Bouchard et al.

(10) Patent No.: US 9,400,680 B2
(45) Date of Patent: Jul. 26, 2016

(54) TRANSPORTATION NETWORK MICRO-SIMULATION WITH PRE-EMPTIVE DECOMPOSITION

(71) Applicant: Xerox Corporation, Norwalk, CT (US)

(72) Inventors: Guillaume Bouchard, Saint-Martin-le Vinoux (FR); Luis Rafael Ulloa Paredes, Meylan (FR)

(73) Assignee: XEROX Corporation, Norwalk, CT (US)

(*) Notice: Subject to any disclaimer, the term of this patent is extended or adjusted under 35 U.S.C. 154(b) by 0 days.

(21) Appl. No.: 14/532,127

(22) Filed: Nov. 4, 2014

(65) Prior Publication Data

US 2016/0124770 A1    May 5, 2016

(51) Int. Cl.
  *G06F 9/46*   (2006.01)
  *G06F 9/48*   (2006.01)
  *G06N 7/00*   (2006.01)

(52) U.S. Cl.
  CPC ............ *G06F 9/4818* (2013.01); *G06F 9/4881* (2013.01); *G06N 7/005* (2013.01)

(58) Field of Classification Search
  CPC .................................................. G06F 9/4818
  USPC ................................. 718/101–108; 717/149
  See application file for complete search history.

(56) References Cited

U.S. PATENT DOCUMENTS

| | | | | |
|---|---|---|---|---|
| 5,506,987 A * | 4/1996 | Abramson | ............ | G06F 9/5033 718/103 |
| 2001/0034751 A1 * | 10/2001 | Eto | ..................... | G06F 9/45537 718/100 |
| 2004/0015973 A1 * | 1/2004 | Skovira | ................. | G06F 9/4881 718/103 |
| 2004/0158831 A1 * | 8/2004 | Amano | ................. | G06F 9/4881 718/100 |
| 2005/0125793 A1 * | 6/2005 | Aguilar | ................. | G06F 9/4843 718/100 |
| 2010/0077327 A1 * | 3/2010 | Pulsipher | ............... | G06Q 10/10 715/764 |

OTHER PUBLICATIONS

Adam, Thomas L., K. Mani Chandy, and J. R. Dickson. "A comparison of list schedules for parallel processing systems." Communications of the ACM 17.12 (1974): pp. 685-690.*

Topcuoglu, Haluk, Salim Hariri, and Min-you Wu. "Performance-effective and low-complexity task scheduling for heterogeneous computing." Parallel and Distributed Systems, IEEE Transactions on 13.3 (2002): pp. 260-274.*

Kim, Jong-Kook, et al. "Dynamically mapping tasks with priorities and multiple deadlines in a heterogeneous environment." Journal of Parallel and Distributed Computing 67.2 (2007): pp. 154-169.*

(Continued)

*Primary Examiner* — Satish Rampuria
(74) *Attorney, Agent, or Firm* — Fay Sharpe LLP (57) ABSTRACT

In a parallel computing method performed by a parallel computing system comprising a plurality of central processing units (CPUs), a main process executes. Tasks are executed in parallel with the main process on CPUs not used in executing the main process. Results of completed tasks are stored in a cache, from which the main process retrieves completed task results when needed. The initiation of task execution is controlled by a priority ranking of tasks based on at least probabilities that task results will be needed by the main process and time limits for executing the tasks. The priority ranking of tasks is from the vantage point of a current execution point in the main process and is updated as the main process executes. An executing task may be pre-empted by a task having higher priority if no idle CPU is available.

18 Claims, 7 Drawing Sheets

(56) References Cited

OTHER PUBLICATIONS

Ben-Akiva, et al., "Traffic Simulation with DynaMIT," Fundamentals of Traffic Simulation, pp. 363-398, Springer (2010).
Cetin, et al., "A Large-Scale Agent-Based Traffic Microsimulation Based on Queue Model," 3rd Swiss Transport Research Conference, pp. 1-22 (2003).
Logan, et al., "The distributed simulation of multi-agent systems," IEEE Special Issue on Agent-Oriented Sorgware Approaches in Distributed Modeling and Simulation,: pp. 174-185 (2001).
Meignan, et al., "Simulation and Evaluation of Urban Bus Network Using a Multiagent Approach," System and Transportation Laboratory, University of Technology Belfor Montbeliard, pp. 1-20 (2007).

* cited by examiner

FIG. 1

TASK PRIORITY QUEUE

| PRIORITY RANK | TASK IDENTIFIER | STATUS |
|---|---|---|
| 1 | ~~~~~ | RUNNING |
| 2 | ~~~~~ | RUNNING |
| 3 | ~~~~~ | SUSPENDED |
| 4 | ~~~~~ | NOT STARTED |
| ... | ... | ... |
| 6 | ~~~~~ | COMPLETED |

TASKS TABLE FOR NODE N

| TASK IDENTIFIER | START TIME FROM NODE N | PROBABILITY OF RUNNING |
|---|---|---|
| ~~~~~ | 642 CYCLES | 0.500 |
| ~~~~~ | 292 CYCLES | 0.333 |
| ~~~~~ | 3144 CYCLES | F(X) |
| ~~~~~ | 98 CYCLES | F(X,Y) |
| ... | ... | ... |
| ~~~~~ | --- | 0.000 |

TRANSPORTATION NETWORK MICRO-SIMULATION WITH PRE-EMPTIVE DECOMPOSITION

BACKGROUND

The following relates to the parallel computing arts, multi-core and multi-CPU computer arts, simulation arts, and so forth.

The heart of a computer is its central processing unit (CPU), which carries out the instructions of a computer program at the machine code level. The CPU executes machine code instructions in a synchronous manner in accordance with instruction cycle time intervals. Given a single CPU, program execution speed is dictated by the instruction cycle time interval, which can be reduced by designing the CPU with faster transistors by reducing transistor channel length, designing transistors with faster switching times, et cetera.

To further improve program execution speed, parallel processing can be employed. In parallel computing, two or more CPUs operate in parallel to execute the computer program. In theory, the execution speed could scale linearly with the number of CPUs in the multi-CPU system, i.e. speed could double for a two-CPU system, triple with a three-CPU system, and so forth. In practice, however, the speed benefit attained by parallel processing is usually much lower. Part of this is due to delays in transmitting signals between processors. These transmission delays can be reduced by monolithically integrating the CPUs on a single substrate (e.g. on a single silicon wafer in the case of typical silicon-based CPUs). When multiple CPUs are implemented on a single chip, the CPUs are sometimes referred to as "cores", and the single-chip multi-CPU processor is referred to as a multi-core processor. The software can also be designed to minimize inter-CPU communication events.

Even with such improvements, the speed gain attained by multi-CPU (i.e. parallel) processing is usually still far less than the theoretical gain due to inefficiencies in the software design. To attain the maximum benefit from a multi-CPU design, every CPU should be executing useful instructions constantly during program runtime. This goal is not reached if one (first) CPU has to stop its processing (sometimes referred to as being in a "locked" state) while it waits for another (second) CPU to complete some task whose results are required by the first CPU in order to continue program execution.

One illustrative computing application that illustrates these issues is transportation network simulation. In a known approach, trips for agents (e.g. vehicles or travelers) are planned in so-called "micro-simulations", and a main simulation process combines trip plans to simulate the overall transportation network. This simulation paradigm is readily adapted to a parallel computing environment by having one CPU handle the main simulation process while delegating the trip planning tasks to other CPUs. However, a bottleneck will arise anytime the main process requires a trip plan that has not yet been generated by a CPU executing in parallel. In such a bottleneck, the CPU executing the main process is locked until it receives the trip plan from the other CPU. If the transportation network simulation takes into account trip-altering events such as accidents, vehicle breakdowns, personal delays, or the like (provided as real-time real-world inputs, or simulated using a pseudo-random perturbance process), then some trip plans required by the main process will change immediately after occurrence of a trip-altering event, and new trips that accommodate the event will need to be planned, leading to lock of the CPU executing the main process.

This can be generalized to any parallel computing situation in which the main process encounters a decision node at which two or more different paths may be followed. Depending upon the decision, different tasks will be called for. As a result, there will be a delay before the CPUs operating in parallel can provide the CPU executing the main process with the task results called for by the decision, resulting in a bottleneck at the main process. Even more generally, this can arise anytime the process being executed by one CPU encounters a decision node and the subsequent paths use results of tasks being performed in parallel by other CPUs.

Disclosed herein are improved parallel computing techniques that overcome the aforementioned disadvantages and others.

BRIEF DESCRIPTION

In some embodiments disclosed herein, a parallel computing method is performed by a parallel computing system comprising a plurality of central processing units (CPUs). The parallel computing method comprises: executing a main process; executing a task priority queue update process to maintain a task priority queue that ranks tasks whose results may be needed by the main process wherein the ranking is based on (i) probabilities that the task results will be needed by the main process and (ii) time limits for executing the tasks; executing tasks in parallel with the executing of the main process on CPUs not used in executing the main process and with execution order of the tasks being in accordance with the task priority queue; and storing, in a completed task results cache, results of tasks whose execution is completed on CPUs not used in executing the main process. The main process is configured to retrieve completed task results from the completed task results cache when needed by the main process. The executing of tasks may include (1) selecting the top-ranked task in the task priority queue that is suspended or not yet started, and (2) executing the selected task on an idle CPU if an idle CPU is available, and may further include (3) if no idle CPU is available, and further conditional upon identifying a task that is of lower rank in the task priority queue than the selected task and that is currently executing on a working CPU, pre-empting execution of the identified task and executing the selected task on the working CPU. The operations (1), (2), and (3) may be repeated for each next-highest-ranked task in the task priority queue until a task is selected in operation (1) that is not executed in operation (2) and is not executed in operation (3). Executing the task priority queue update process may comprise: identifying the tasks whose results may be needed by the main process based on a current execution point in the main process; for each identified task, assigning a probability that the task result will be needed by the main process based on the current execution point in the main process, a time limit for the task relative to the current execution point in the main process, and a score for the task that is computed based on the probability and time limit; and ranking the identified tasks in the task priority queue in accordance with the assigned scores. The time limit for each task may be quantified, for example, as time when the result of the task will be used by the main process, or as task execution start time in order for the result of the task to be available in the completed task results cache when the result of the task will be used by the main process, and the time limit may for example be measured in time units or instruction cycles. In some illustrative embodiments, the main process comprises a transportation network simulation process and the tasks include trip planning tasks for individual vehicles or travelers.

In some embodiments disclosed herein, a non-transitory storage medium stores instructions executable by a parallel computing system comprising a plurality of CPUs to perform a parallel computing method comprising: executing a main process; while executing the main process, executing a task priority queue update process to maintain a task priority queue that, for a current execution point in the main process, ranks tasks whose results may be needed by the main process at an execution point in the main process that is later than the current execution point; executing tasks in parallel with the executing of the main process on CPUs not used in executing the main process and with the executing of tasks being initiated in accordance with the task priority queue, the executing of tasks including storing results of completed tasks in a completed task results cache. The task priority queue update process ranks tasks based on probabilities that the task results will be needed and time limits relative to the current execution point in the main process for executing the tasks. The main process is configured to retrieve completed task results from the completed task results cache when needed by the main process. The task priority queue update process may comprise: from the vantage point of the current execution point in the main process, identifying the tasks whose results may be needed by the main process; for each identified task, assigning a probability that the task result will be needed by the main process and a time limit for the task relative to the current execution point in the main process; and ranking the identified tasks in the task priority queue based on the assigned probabilities and time limits. In some illustrative embodiments, the main process comprises a main simulation process (for example, a transportation network simulation process) and the tasks include micro-simulations (for example, trip simulations for individual vehicles or travelers) whose results are used by the main simulation process.

In some embodiments disclosed herein, an electronic data processing system comprises a non-transitory storage medium as set forth in the immediately preceding paragraph, and a parallel computing system comprising a plurality of CPUs. The parallel computing system is operatively connected with the non-transitory storage medium to read and execute the instructions stored on the non-transitory storage medium.

In some embodiments disclosed herein, a parallel computing method performed by a parallel computing system comprising a plurality of CPUs is disclosed. The parallel computing method comprises: executing a main process; executing tasks in parallel with the main process on CPUs not used in executing the main process, and storing results of completed tasks in a completed task results cache from which the main process retrieves completed task results when needed by the main process; and in executing tasks, controlling the initiation of task execution in accord with a priority ranking of tasks where the task priorities are based on at least probabilities that task results will be needed by the main process and time limits for executing the tasks. The priority ranking of tasks is from the vantage point of a current execution point in the main process and the priority ranking is updated with advancement of the current execution point as the main process executes. Controlling the initiation of task execution may include pre-empting an executing task by a task having higher priority in the priority ranking of tasks if no idle CPU is available for initiation of execution of the task having higher priority in the priority ranking of tasks. The parallel computing method may further comprise removing the result of a completed task from the completed task results cache in response to the probability going to zero that the result of the completed task will be needed by the main process as the priority ranking is updated with advancement of the current execution point. In some illustrative embodiments, the main process comprises a main simulation process and the tasks include micro-simulations whose results are used by the main simulation process.

DETAILED DESCRIPTION

In a parallel computing system comprising a plurality of central processing units (CPUs) performing processes in parallel, a CPU can be underutilized if it enters a waiting state (i.e. lock) due to the need to receive a task result via the communication network from another CPU performing another task. Such a bottleneck can occur, for example, in real-world simulations that rely on constituent micro-simulations in which a large number of entities (e.g. up to millions of entities in some cases) are being simulated and these simulations need to be synchronized, e.g. by a main simulation. Various approaches are known to decompose computations during simulations to leverage parallel computing.

Improved decompositions disclosed herein avoid bottlenecks and enable all resources to be used with reduced or eliminated bottlenecks. Decompositions disclosed herein relax the determinism of task execution, by executing tasks that will probably (but not necessarily) be needed in the future. To this end, a task priority queue is maintained, and tasks are fed to computation nodes (CPUs) for execution in accord with the task priority queue.

By way of a simple illustration, consider a simple algorithm involving tasks F, K, H, G, and W each of which is dependent on a parameter x. The algorithm is as follows:

If F(x)>90: result=K(x)
Else if H(x)<12: result=G(x)
Else: result=W(x)

In this algorithm, task F and task H are always executed before task W and task G. If enough CPUs are available in the parallel computing system, then it would be possible to execute all five tasks F, K, H, G, and W in parallel so as to minimize the execution time. If not enough CPUs are available to do this, then as disclosed herein execution of the tasks is prioritized. The tasks are ordered in a task priority queue according to their expected cost (depending on x) and probability of execution, so if task K was unlikely to be needed and execution of task F is very long then with two CPUs the execution of H, G and W could be done with one CPU in sequence in parallel with execution of task F on the other CPU (this process is called task domination and interruption pre-emption). Even if the result of completed task G(x) was wasted computed but not used by the algorithm, which is the case for example if F(x)>90, the overall execution time is still improved.

Some parallel computing systems described herein as illustrative examples are computer simulations, such as a transportation network simulation. Such simulations can be done on various scales. Micro-simulation models define a large number of objects, called agents, with their own behavior, such as the drivers in their cars in a traffic simulation framework. In contrast, macro-simulation models are considering aggregations of these elements, such as flows of cars. In between, meso-simulation models trying to balance the best of both worlds. An advantage of micro-simulation is that it is easier to integrate discrete events, such as accidents, and non-trivial constraints, such as pedestrian walking next to each other.

Simulation of large scale distributed systems is difficult to parallelize because inter-dependent operations must be synchronized. For example, splitting a large city into small areas and simulating each of these areas on a different computer would require to constantly updating the boundaries of these areas, which reduces simulation speed due to communication cost.

In the case of simulating a transportation network, planning the trip for each possible agent (e.g. vehicle or traveler) in the simulation is computationally costly. To illustrate the scale of the problem, if one wishes to simulate a city with a million people going to and from work every day, one would need two million different trip planning computations for every simulated day. Even if the trip planning task returns the optimal trip in less than 100 milliseconds, more than 55 hours of computation is occupied just for computing the trips. Moreover, the specific trips that need to be planned may change in response to events such as traffic accidents, bus breakdowns, or so forth. Such an event implicates the "butterfly effect", in which the event can potentially change all future events.

In approaches disclosed herein, trip planning for the simulated agents (travelers, vehicles, et cetera) is performed before the trip actually begins. As a consequence, it is possible to compute the trips in advance using an independent trip task process, running on a CPU different from the one running the main simulation process, so that the result of the trip task is available when the main simulation reaches the point in (simulated) time in which traveler actually starts the trip (in the likely case in which intervening events do not cause the trip to be changed or canceled). This approach of distributed computing is referred to herein as "pre-emptive decomposition". In this approach, it is assumed that the simulation can be carried out on a single CPU, but costly operations (e.g. trip planning tasks) are forwarded to other CPUs so that the main simulation process is not slowed down by the costly trip planning operations.

Some distributed simulator concepts are discussed next.

The "big data" trend comes with a variety of data storage solutions which includes the legacy relational databases (where data are represented in different tables through relations) and the NO-SQL databases (where less constrained data allows for simpler/faster horizontal architecture). The disclosed parallel computing techniques in which tasks are performed based on probability of need and time frame via a task priority queue are independent of the database model. In one illustrative implementation, a simulation in a NO-SQL Memory (as in RAM memory) database is employed.

Various communications approaches for communicating between CPUs can be used in distributed computing. Two common communication mechanisms for this purpose are "Message passing" (where processors have independent memories and receive/send variables through messages over the network) and "Shared-memory" (where processors share memory addresses and have direct access to shared global variables). The disclosed parallel computing techniques in which tasks are performed based on probability of need and time frame via a task priority queue are independent of the communication method and can be implemented using either message passing or shared memory communications.

When doing simulation using a parallel computing system, the simulator can be partitioned into modules. Depending on the nature and type of simulation, some common modules are: routing, traffic simulation, activities generation and pre/post-processing. Common agents in these simulations are vehicles and/or travelers. Some general strategies for distribution are described in the following.

In functional decomposition or task parallelization, different modules (or functions of modules) run on different CPUs. As compared with simulation on a single CPU, little or no change to the simulation algorithm is needed to implement this distribution. Also, because of the nature of this decomposition (generally big chunks of data passing from module/function to module/function), it tends to be insensitive to network bottlenecks (in other approaches locking and syncing can easily generate bottlenecks depending on bandwidth and latency). A disadvantage of functional decomposition or task parallelization is that the computation of the weakest link in the chain (the module/function that takes more time) is not decomposed therefore parallelization may not offer a significant gain of computing time.

By contrast, in domain decomposition each module (or function of module) is distributed across several CPUs. For most modules this type of decomposition is straightforward to implement because most of the modules consider travelers as independent. Some other modules (mainly those where agents interact with each other) are harder to decompose by domain decomposition. In such cases, the usual approach is to find boundaries that will limit communication between computation groups. For example, in a transportation network simulation, such boundaries may be geographical boundaries (mountains, rivers, national boundaries, et cetera) across which travel is limited. The best decomposition depends on the simulator but also on the number of agents and their interactions. The optimum number of groups may be found empirically for each city or other region, and this optimum sets the limit where increasing groups would also increase simulation time because of overall communication time.

The disclosed parallel computing techniques perform tasks based on probability of need and time frame via a task priority queue. The approach distributes computation of single probable tasks to CPUs other than the CPU running the main simulation. Task results generated by these other CPUs are cached in a completed task results cache, from which they are retrieved by the main simulation when needed. New tasks needed sooner with a higher probability of need will pre-empt tasks already scheduled but with a later, less probable execution. Advantageously, changes to the simulation algorithm to implement this approach are limited, and the granularity of decomposition lies close to agent level.

An apparent disadvantage of the disclosed approaches is that computational resources are "wasted" if a probable task is performed but the result is never used by the main process. However, this apparent disadvantage is not as significant as might be expected. In some actually performed experiments for a public transport simulator applied to two cities (Nancy, France and Adelaide, Australia), this "wasted" time amounted to less than 0.001% of the total computation time.

Figure 1:
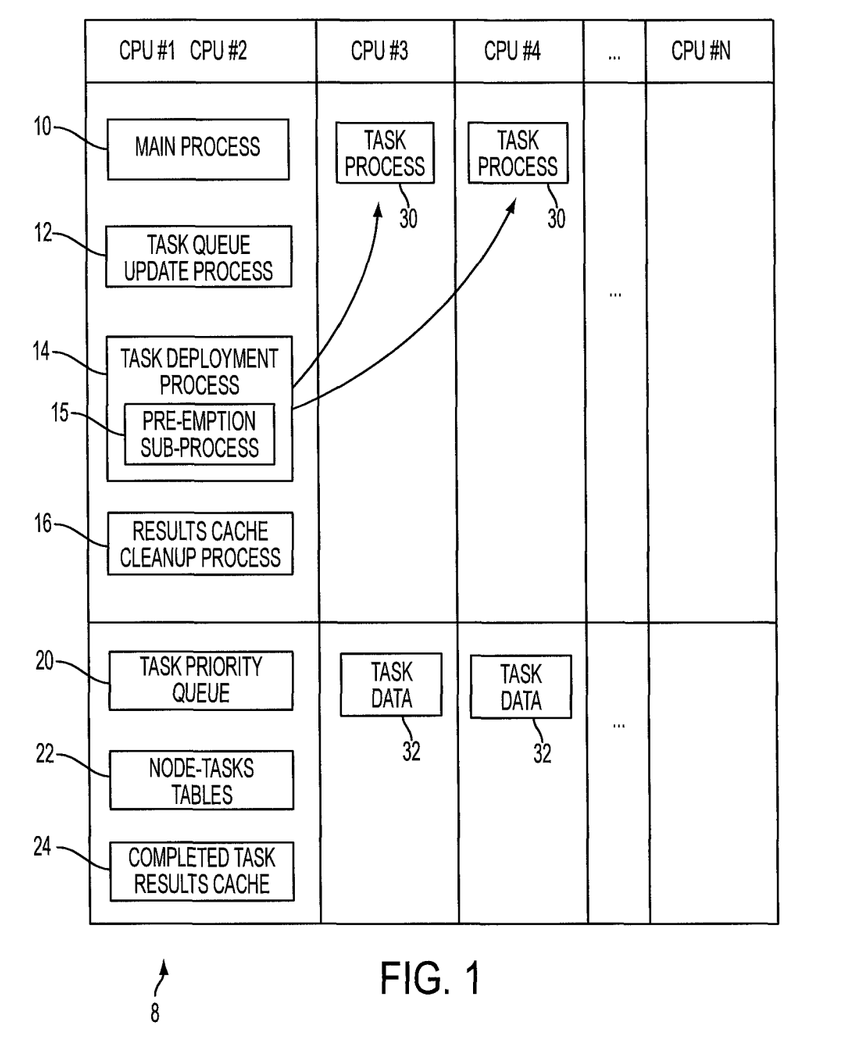
FIG. 1 diagrammatically illustrates a parallel computing system with N central processing units (CPUs) as disclosed herein.

With reference to FIG. 1, a parallel computing system 8 includes a plurality of central processing units (CPUs), enumerated in FIG. 1 as "CPU #1", "CPU 2", "CPU #3", "CPU #4", . . . , "CPU #N". One or more CPUs, namely CPU #1 and CPU 2 in illustrative FIG. 1, perform a main process 10 and ancillary processes including a task queue update process 12, a task deployment process 14 including a pre-emption sub-process 15, and a results cache cleanup process 16. The CPU or CPUs performing these processes 10, 12, 14, 16 also have access to data structures including a task priority queue 20, a set of node-tasks tables 22, and a completed task results cache 24. On CPUs other than the CPU or CPUs that run the main process 10, various tasks 30 are executed. In illustrative FIG. 1, CPU #3 and CPU #4 are executing tasks 30, while CPU #N is idle. Each executing task 30 may, in general, have access to task data 32 relevant to that task.

During operation, the initiation of task execution is performed by the task deployment process 14 in accord with a priority ranking of tasks stored as the task priority queue 20. The task priorities are set by the task queue update process 12 based on at least probabilities that task results will be needed by the main process 10 and time limits for executing the task. Results of completed tasks are stored in the completed task results cache 24, from which the main process 10 retrieves completed task results if and when needed by the main process. The priority ranking of tasks performed by the task queue update process 12 is from the vantage point of a current execution point in the main process 10, and the priority ranking is updated with advancement of the current execution point as the main process 10 executes. The main process 10 includes various decision nodes at which the path of execution depends upon a decision made at the decision node. These decisions, in turn, in general may depend on parameter values of parameters of the main process 10. For example, in the illustrative algorithm:

If F(x)>90: result=K(x)
Else if H(x)<12: result=G(x)
Else: result=W(x)

the expression "If F(x)>90" defines a decision node—one possible path is "result=K(x)" which is the path if the decision at the decision node is that the task F returns a value greater than 90, which in turn depends upon the parameter value of the parameter x. The other possible path begins with the first "Else" operation. In some cases the execution path of the main process 10 results in the probability of the main process 10 needing some task result going to zero. For example, in the expression "If F(x)>90" if task F outputs a value that is less than or equal to 90 then the probability of needing the result of the task K goes to zero as the path that uses task K is bypassed. In such a case, if the task K was already performed, e.g. as one of the tasks 30 shown in FIG. 1, so that the result of task K is in the results cache 24, then this result is no longer useful, and the results cache cleanup process 16 suitably removes this result from the cache 24. Results for less probably needed tasks may also be removed by the cleanup process 16 in order to clear space to store results of more probably needed tasks.

Figure 2:
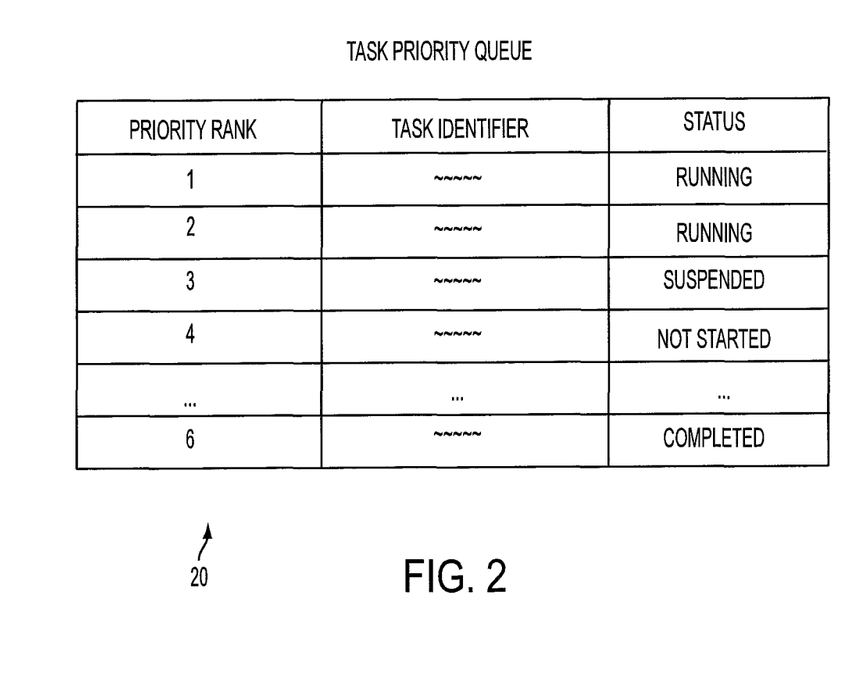
FIG. 2 diagrammatically shows a suitable data structure for the task priority queue of the parallel computing system of FIG. 1.

With reference to FIG. 2, an illustrative structure suitable for the task priority queue 20 is shown, which includes columns for a task identifier (middle column), task priority rank (left column), and task status (right column). The task status may be "not started", "running", or "completed". (The terms "executing" and "running" in the context of a process that is executing or running on a CPU are used interchangeably herein). In an alternative formalism, tasks which are completed are removed (or omitted) from the task priority queue 20. In the illustrative embodiment a task which is pre-empted by the pre-emption sub-process 15 of the task deployment process 14 (see FIG. 1) may optionally be placed into a suspended state in which its task data 32 is retained so that the task can be resumed at a later time—this is indicated in the illustrative task priority queue 20 by the status "suspended". These are merely illustrative examples, and additional or other task states are contemplated, such as a "lock" state indicating a task which is interrupted due to need for data from some other process running on a different CPU.

Figure 3:
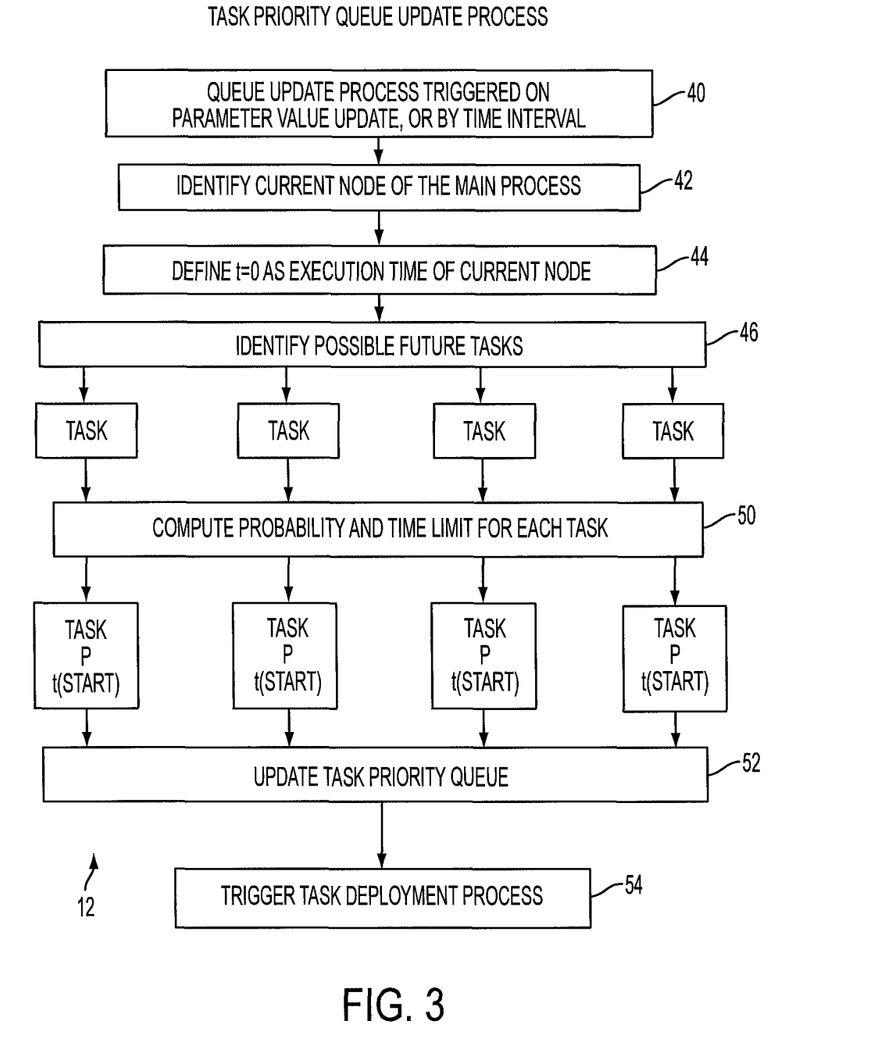
FIG. 3 diagrammatically shows an illustrative embodiment of the task priority queue update process of the parallel computing system of FIGURE FIG. 4 diagrammatically shows a suitable node-tasks table data structure for use in the task priority queue update process of FIG. 3.

With reference to FIG. 3, an illustrative embodiment of the task priority queue update process 12 is shown. In a trigger operation 40, the illustrative update process 12 is triggered by an event that could change the priority ranking of tasks in the task priority queue 20. For example, changing a parameter value of a parameter on which a decision node depends may optionally trigger the update process 12. As an illustration of this, the decision node "If F(x)>90" depends on the parameter value of the parameter x, so changing the value of x may trigger execution of the update process 12 in order to re-rank the task priorities to reflect the new value of x. Another "event" that may trigger the update process 12 is mere passage of time (or, more precisely, progression of execution of the main process 10). This is because, as described hereafter, the priority of a task depends in part on its time limit relative to the current execution point in the main process 10—thus, as main process execution continues, the current execution point progresses forward and the time limits shorten, which may lead to task priority re-ranking. The execution passing through a decision node of the main process 10 may also trigger the update process 12 since the decision at the node may cause some tasks to be bypassed entirely, leading to their probabilities going to zero.

With continuing reference to FIG. 3, when triggered, the task priority queue update process 12 initially identifies the current node of the executing main process 10 in an operation 42—in other words, the operation 42 determines where the execution of the main process 10 is currently at. In an operation 44, this current node of the executing main process 10 is designated at time t=0. (Note that "time" may be measured in time units, e.g. seconds, microseconds, et cetera; or may be measured in instruction cycles of the main process 10). In some embodiments, the current node determined in the operation 42 may not be precisely the location of the instruction pointer of the processor executing the main process 10, but it should be close. For example, in some embodiments tasks tables 22 are not provided for every node of the main process 10, but rather only for certain key nodes where flow branches or otherwise may entail decision processes—in such embodiments, the operation 42 suitably determines the closest (or next) node along the flow of the main process 10 for which a tasks table 22 is provided.

In an operation 46, the possible future tasks are determined from the vantage point of the current node of the executing main process 10 (as identified in the operation 42). In determining the future tasks, the vantage point of the current node is relevant. To see this, consider again the illustrative algorithm:

If F(x)>90: result=K(x)
Else if H(x)<12: result=G(x)
Else: result=W(x)

From the vantage point of the "If" statement, all tasks K, H, G, and W have some non-zero probability of being needed. By contrast, from the vantage point of the first "Else" statement, the task K has zero probability of being needed (because execution has passed the "If F(x)>90" decision point with F being less than or equal to 90, meaning that there is no possibility that the result of task K will be needed). Thus, from the vantage point of the "If" statement, K is a possible future task; whereas, from the vantage point of the first "Else" statement K is not a possible future task. From the vantage point of the first "Else" statement, H, G, and W remain possible tasks. As a further illustration, from the vantage point of the second "Else" statement, only task W is a possible future task (indeed, it has 100% likelihood of being needed).

Figure 4:
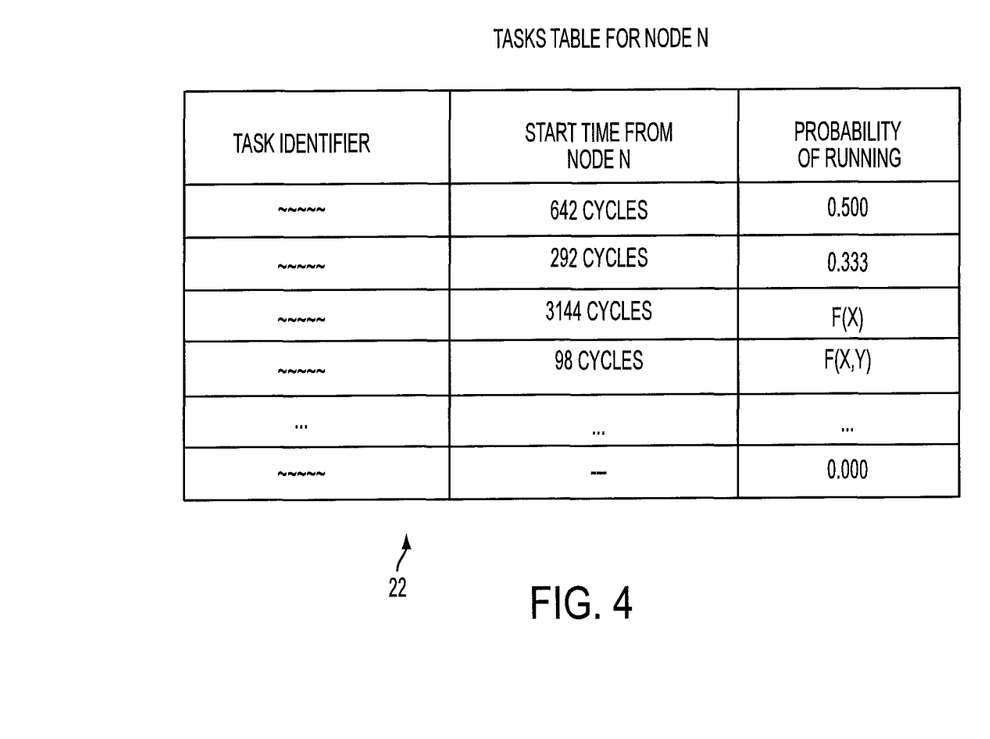

With continuing reference to FIG. 3 and with further reference to FIG. 4, in one approach the operation 46 identifies all possible further tasks from the vantage point of the current node by referencing a task table 22 for the current node. FIG. 4 illustrative a possible data structure for the tasks table 22 (where the current node of the main process 10 is denoted as "node N"). The tasks table 22 for each node may be constructed during the computer programming performed to construct the computer code implementing the main process 10. Again, in the interest of programming efficiency it is contemplated to provide such a tasks table only for certain key nodes, that is, for fewer than all possible nodes.

At an operation 50 the probability and the time limit for each task is computed. Various approaches can be used. In one approach, the tasks table 22 for current node N lists the probabilities and time limits referenced to the current node N, and thus operation 50 references tasks table 22 for this information. For such embodiments, the tasks table 22 suitably includes the task identifier (used in the operation 46), task start time from node N, and probability of running from the vantage point of node N. As with the probabilities, the start time (or other time limit) for executing a task is measured from the vantage point of the current node identified in the operation 42.

The time limit for each task determined in the operation 50 may be variously quantified. One approach is to use the time when the result of the task will be used by the main process 10 as the time limit for the task. A more accurate time limit (used in the illustrative task table 22 of FIG. 4) is the task execution start time in order for the result of the task to be available in the completed task results cache when the result of the task will be used by the main process. This latter time limit accounts for the generally different execution times of different tasks, so that if one task takes longer to perform than another task then this will be accounted for by having an earlier time limit. However, this latter approach requires an estimate of the total time of execution to complete the task, which may be difficult to estimate as it may depend on the CPU speed of the particular CPU allocated to perform the task (relevant if the parallel computing system comprises CPUs with different computing speeds) and/or on various input parameters of the task. However, as the goal of the task priority queuing is to determine an order of task execution, approximate estimates of the time limits is generally efficient, so that an approximate estimate of the total time of execution is suitable, or as already mentioned in some embodiments the time of execution is neglected and the time limit is simplified to be the time when the result of the task will be used by the main process 10. This simplification may be appropriate if, for example, the different tasks are expected to have similar execution times, or if the execution time of the main process 10 is much longer than the execution times of the tasks 30.

As seen in FIG. 4, it is contemplated for some task probabilities to be constructed in the tasks table 22 as functions of program parameters. By way of illustrative example, a person may be more likely to take the bus if it is raining, and more likely to bicycle to work if it is sunny. Thus, the probability of needing a bus route planning task may be higher if the weather forecast is predicting rain; whereas, the probability of needing a bicycle route planning task may be higher if the weather forecast is predicting fair weather. Although not shown in FIG. 4, it is also contemplated to construct the time limits for tasks to be functionally dependent on program parameters. For example, if rain is forecast then workers may elect to stay at work longer so that the trip home planning task may occur later (on average) in the simulation.

With continuing reference to FIG. 3, in an operation 52 the task priority queue 20 is updated based on the task priorities and time limits computed in the operation 50. In one approach, a priority score is computed for each task based on the probabilities and the time limits, and the identified tasks (from operation 46) are ranked in the task priority queue 20 in accordance with the assigned scores. One suitable score is score=probability/time limit, although different and/or more complex scoring formulae are contemplated. It is also contemplated to incorporate other factors into the scoring, such as the total execution time of a task (e.g., increasing a task's priority if its total execution time is long since a long execution time translates to a long lock time for the CPU performing the main process 10 if it must wait for execution to complete).

With continuing reference to FIG. 3, in an operation 54, after completing the tasks priority queue update operation 52 the task deployment process 14 is optionally triggered in an operation 54, so that any priority updates are given rapid effect.

Figure 5:
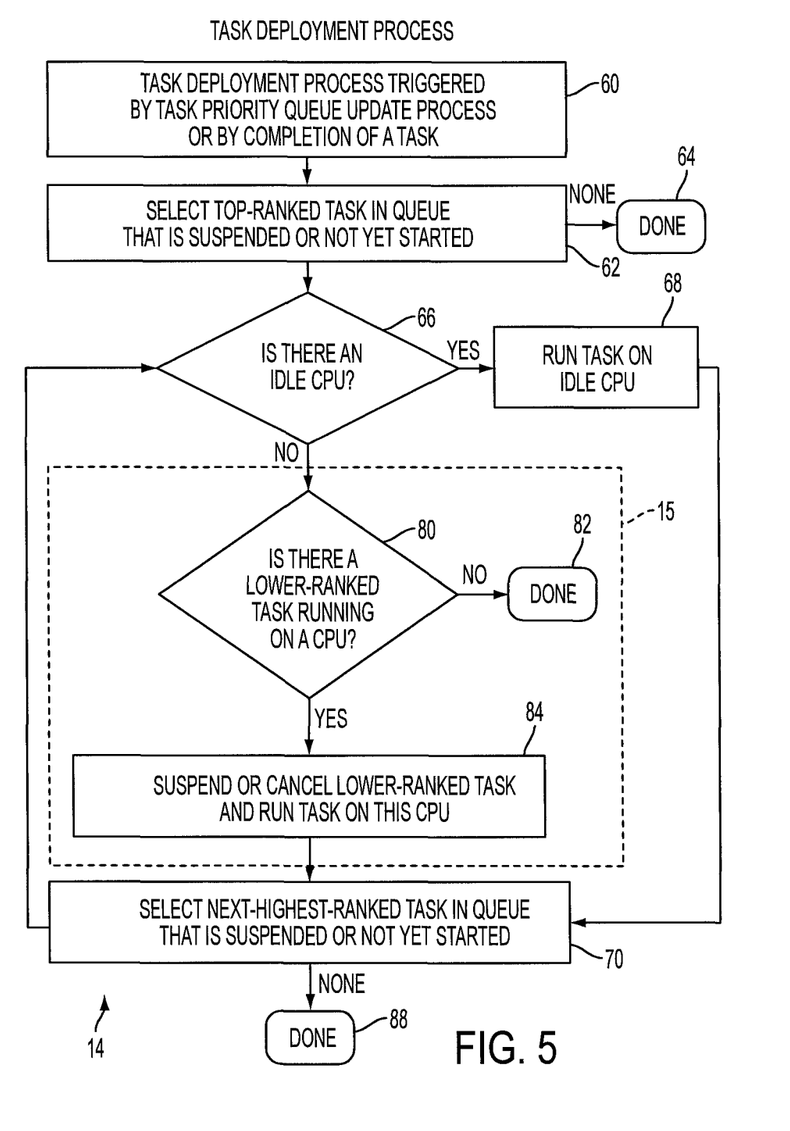
FIG. 5 diagrammatically shows an illustrative embodiment of the task deployment process of the parallel computing system of FIG. 1.

With reference to FIG. 5, an illustrative embodiment of the task deployment process 14 is shown. In a trigger operation 60, the task deployment process 14 is triggered by operation 54 of the queue update process (see FIG. 3), or by completion of a task (such that a CPU becomes available to perform another task in the task priority queue 20). In an operation 62, the top-ranked task in the queue 20 that is suspended or not yet started is identified. (The "Not yet started" status also applies to any task that was started but terminated prematurely due to pre-emption by a higher-ranked task as described elsewhere herein). If no task is identified in the operation 62, then this means that all tasks to be executed are either already completed or running—in this case the task deployment process terminates at operation 64.

On the other hand, if the operation 62 identifies a highest-ranked task that is either not yet started or suspended, then in an operation 66 it is determined whether there is an idle CPU on which to perform the task—if so, then in an operation 68 the task is run on the idle CPU, and processing moves to an operation 70 to begin the next iteration by selecting the next-highest-ranked task in the queue 20 that is either not yet started or suspended.

If, on the other hand, the operation 66 finds no CPU is idle, then process flow transfers to the pre-emption sub-process 15 (also see FIG. 1). At a decision block 80, the pre-emption sub-process 15 starts by determining whether there is a lower-ranked task in the queue 20 that is already running on a CPU. Here "lower-ranked" is with respect to the task identified in the operation 62 (or, for second and subsequent iterations, the task identified in the operation 70). With brief reference back to FIG. 2, the task priority queue 20 suitably lists task status, including those tasks that are currently running, in order to facilitate the operation 80. If no lower-ranked already-running task is identified, then the task deployment process 14 terminates in an operation 82.

On the other hand, if the operation 80 identifies a lower-ranked task in the queue 20 that is already running on a CPU, then in an operation 84 the already-running task is pre-empted, that is, placed into a suspended state or canceled (i.e. terminated), and the task identified in the operation 62 (or in the operation 70 for second and subsequent iterations) is run on the task freed by the pre-emption. The pre-emption sub-process 15 is thus completed, and process flow then passes to the operation 70 to begin the next iteration by selecting the next-highest-ranked task in the queue 20 that is either not yet started or suspended. If no such task is found in the operation 70, then processing terminates at an operation 88.

Operation of the task priority queue update process 12 of FIG. 3 and the task deployment process 14 of FIG. 5 ensures that tasks are run based on the likelihood or probability that they are needed and the time horizon (i.e. time limit) for running each task. Results of completed tasks are stored in the completed task results cache 24 which is then accessed by the main process 10 if and when those results are needed by the main process 10. This approach advantageously facilitates efficient usage of the CPUs of the parallel computing system 8 by enabling tasks 30 to be performed by available CPUs prioritized on a probabilistic likelihood-of-soonest-need basis, rather than deterministically waiting until the task is actually needed by the main process 10. Bottlenecks and locking of the CPU(s) running the main process 10 are thus mitigated or prevented entirely.

The cost of providing this benefit is that some computing resources may be "wasted" in that a task may occasionally be executed on a CPU whose result is never used by the main process 10. It is recognized herein that this "waste" is in practice largely illusory, because it is far outweighed by the larger cost associated with locking the main process to await results of tasks that have not yet completed. However, a more realistic disadvantage is that the completed task results cache 24 occupies valuable storage space. Additionally, if the completed task results cache 24 has finite capacity (which is usually the case), then there is the potential for the cache 24 to fill completely, leading to an overflow condition, main process lock, or other remediation (depending upon the remedial mechanism employed). This possibility is enhanced if task results that will never be needed because the main process 10 has progressed remain stored in the cache 24.

Figure 6:
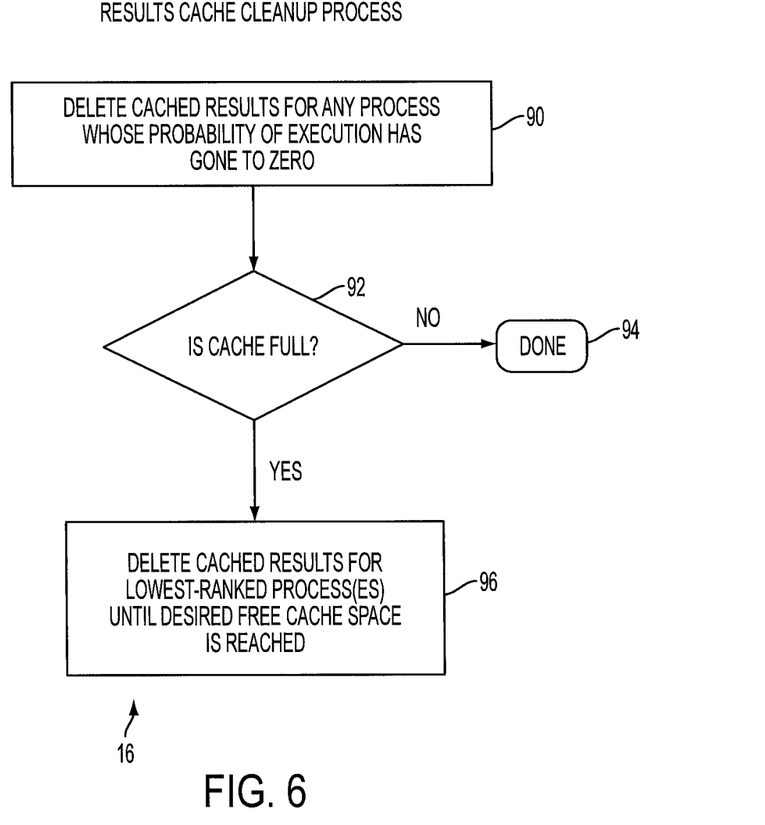
FIG. 6 diagrammatically shows an illustrative embodiment of the results cache cleanup process of the parallel computing system of FIG. 1.

With reference to 6, the results cache cleanup process 16 is provided to mitigate or eliminate this possible disadvantage. In the simplest version, the cleanup process includes an operation 90 in which the result of any task whose probability of execution has gone to zero is deleted. In one suitable approach, the operation 90 is triggered by operation 42 of the task priority queue update process 12 (see FIG. 3) and examines the tasks table 22 for the current node N of the main process 10 identified in operation 42 to find any task whose probability of execution has gone to zero (that is, has probability of running equal to zero). In a variant embodiment, the probability threshold for result deletion may be higher than zero, i.e. any process whose probability of being needed is below some (small) probability threshold is deleted.

Optionally, the results cache cleanup process 16 includes further operations that handle a cache full (or nearly full) condition. To this end, an operation 92 determines whether the completed task results cache 24 is full (or nearly full). If not, then the process 16 terminates in operation 94. On the other hand, if the cache is (nearly) full as determined in the operation 92, then in an operation 96 task results are deleted for those completed tasks that are lowest ranked in the task priority queue 20, until a desired free cache space is achieved.

The parallel computing system 8 may be variously implemented. For example, the parallel computing system 8 may be a multi-processor computer having the multiple CPUs within a single machine, or a multi-core computer having the CPUs on a single chip (i.e., the CPUs are the cores), or a cluster computing system in which the CPUs reside in separate computers that are networked together via a local area network (LAN) or the like to form a single parallel computing system, or a massively parallel processing (MPP) system (similar to a cluster but with a specialized/dedicated inter-CPU communication system), various combinations thereof (e.g. a multi-processor computer having multiple processors with some or all processors being multi-core), or so forth. The number of CPUs of the parallel computing system must be at least two (i.e. a plurality of CPUs, in order to benefit from running tasks on a CPU different from the CPU running the main process 10), but preferably the parallel computing system 8 includes three, four, several, five, ten, twenty, tens, hundreds, or more CPUs. In embodiments such as clusters, it is contemplated for the parallel computing system 8 to be a time-sharing system in which an embodiment of the disclosed parallel computing method for a simulation or the like is executed in a time-sharing fashion with other programs.

In some embodiments all CPUs of the parallel computing system are identical; in other embodiments, the parallel computing system may comprise CPUs with different execution speeds or other different characteristics (storage space, communication speed, et cetera). In latter embodiments, it is contemplated for the task deployment process to take into account CPU capabilities in deploying tasks—for example, a computationally intensive task may be preferentially (or even exclusively) allocated to a CPU with fast processing speed, or a task that requires a large dynamic memory (e.g. large accessible RAM space) may be preferentially (or even exclusively) allocated to a CPU with suitably large RAM space. In one suitable approach, this may be implemented by including one or more additional columns in the tasks table (cf. FIG. 4) to store CPU requirements for the process.

In another variant approach, some tasks requiring high computational speed may be programmed to leverage parallel processing and may be deployed to two or more CPUs for execution. In such embodiments, the parallel processing performed at the task level may be conventional deterministic parallel processing coding; or, the task may itself be configured as a main process with sub-tasks executing based on probability of need and time limit for need as disclosed herein.

The parallel computing methods disclosed herein may also be embodied as a non-transitory storage medium storing instructions executable by the parallel computing system 8 comprising a plurality of CPUs to perform an embodiment of the disclosed parallel computing method. The non-transitory storage medium may, for example, be a hard disk or other magnetic storage medium, or a FLASH memory or other electronic storage medium, or an optical disk or other optical storage medium, various combinations thereof, or so forth.

The illustrative embodiments described with reference to FIGS. 1-6 are merely illustrative examples, and numerous other approaches, data structure configurations, and so forth can be employed to implement the disclosed parallel computing technique in which tasks that may be needed by a main process in the future are executed on a prioritized basis in which task priority is determined based on probability of being needed and a time limit both determined from the vantage point of a current node of the main process.

In the following, an illustrative example of a transportation network simulation performed using parallel processing techniques as disclosed herein is described. Experimental results were obtained for a public transport simulator for two cities (Nancy, France and Adelaide, Australia). A computation cluster with 19 machines was used as the parallel computing system. The experiments indicated a speed increase (measured as $$\frac{single\ processor\ time}{distributed\ time})$$

of around 150, with an efficiency increase (measured as $$\frac{speed\ up}{number\ of\ processors\ used})$$

of around 0.75, and a real-time ratio (RTR, measured as $$\frac{time\ in\ simulation}{real\ computation\ time})$$

of around 288.

In principle all events and actions in a micro-simulation are done step-by-step. This means that in the simulated world no two actions happen exactly at the same time, even if only spaced by a few micro-seconds. However when simulating persons, the planning of their public transportation journey is done beforehand (as task used by the main simulation process), and this is where opportunities of distributing computation (also known as decomposition) arise. In the experiments, a single instance of the transportation network was simulated by a main process. During the simulation, every time a trip needs to be planned, a new trip planning task is added to the task priority queue, and tasks are ordered by expected time of need and probability of need as disclosed herein. Trip planning tasks were executed as task processes on CPUs other than the CPU running the main process, so as to not interrupt the main simulation process. Once the task process finished computing the trip, the task result was stored, and was (at least in most cases) used later by the main simulation process when the trip actually begins in the main simulation. (If the main simulation process requires starting a trip, whose computation is not finished yet, it waits for the result. However, such an event remains rare if the prioritized execution of tasks operates as desired, i.e. the simulation is not stopped too often.)

Figure 7:
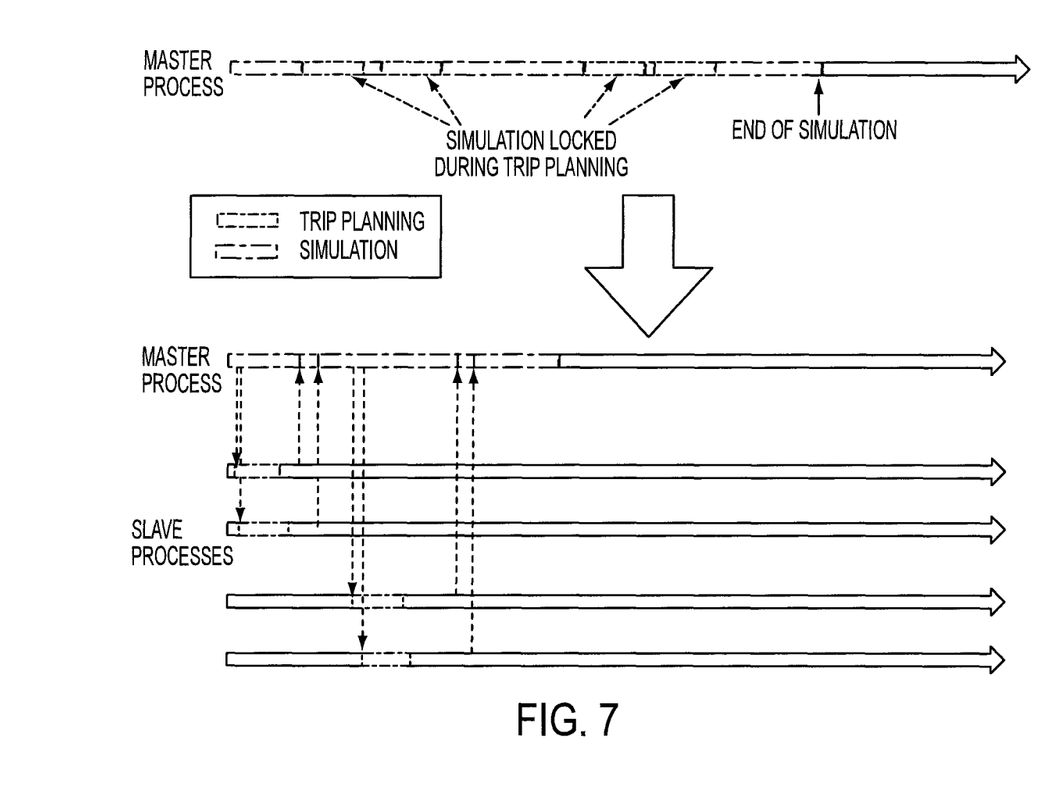
FIG. 7 diagrammatically shows execution of a transportation network simulation using a conventional parallel computing system (top) and using the parallel computing system of FIG. 1 (bottom).

With reference to FIG. 7, the results of the simulation are diagrammatically indicates (FIG. 7 is diagrammatic and does not show actual simulation results). As seen in the top diagram of FIG. 7, without a distribution system, the total simulation time T is the sum of the simulation time S assuming instantaneous trip planning computations and the total time P for planning the trips, that is, T=S+P. On the other hand, as seen in the bottom diagram of FIG. 7, using an embodiment of the disclosed parallel processing technique, and designating total main process lock time and wasted time (sum of delays due to unfinished and unused computation of trips) as $\epsilon$, the total simulation time T is reduced to T=S+$\epsilon$. It is expected that $\epsilon$ will be small, and ideally approaches zero as if all trips are successfully pre-computed then E corresponds to the time for retrieving trip results from the completed task (i.e. trip) results cache. Indeed, in the actually performed public transport simulator results for Nancy and Adelaide, performed on a cluster of 19 machines and a moderate city size, s was found to be negligible.

In general, it will be appreciated that the disclosed parallel computing techniques can be extended to other simulations in which there is a need for computationally intensive tasks for some of the simulated agents, and the need for some of these computationally intensive tasks can be estimated before they are needed in the simulation. In such a case, using the techniques disclosed herein the simulation does not need to be locked while computing the task, and the wasted tasks take less time than the gained time. The simulation is locked only if a task result is needed for which the computation of the task has not yet finished at the time it was needed, or if the task was not predicted (and hence was never added to the task priority queue.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A parallel computing method performed by a parallel computing system comprising a plurality of central processing units (CPUs), the parallel computing method comprising:
   executing a main process;
   executing a task priority queue update process to maintain a task priority queue that ranks tasks for a current execution point whose results will be needed with non-zero probability by the main process wherein the task priority queue update process comprises:
      identifying the tasks whose results will be needed with non-zero probability by the main process based on the current execution point in the main process,
      for each identified task, assigning a probability that the task result will be needed by the main process based on the current execution point in the main process, a time limit for the task relative to the current execution point in the main process, and a score for the task that is computed based on the probability and time limit, and
      ranking the identified tasks in the task priority queue in accordance with the assigned scores;
   executing tasks in parallel with the executing of the main process on CPUs not used in executing the main process and with execution order of the tasks being in accordance with the task priority queue; and
   storing, in a completed task results cache, results of tasks whose execution is completed on CPUs not used in executing the main process;
   wherein the main process is configured to retrieve completed task results from the completed task results cache when needed by the main process.

2. The parallel computing method of claim 1 wherein the executing of tasks comprises:
   (1) selecting the top-ranked task in the task priority queue that is suspended or not yet started; and
   (2) executing the selected task on an idle CPU if an idle CPU is available.

3. The parallel computing method of claim 2 wherein the executing of tasks further comprises:

(3) if no idle CPU is available, and further conditional upon identifying a task that is of lower rank in the task priority queue than the selected task and that is currently executing on a working CPU, pre-empting execution of the identified task and executing the selected task on the working CPU.

4. The parallel computing method of claim 3 wherein the executing of tasks further comprises repeating the operations (1), (2), and (3) for each next-highest-ranked task in the task priority queue until a task is selected in operation (1) that is not executed in operation (2) and is not executed in operation (3).

5. The parallel computing method of claim 1 wherein the time limit for each task is quantified as one of:
   (a) time when the result of the task will be used by the main process, and
   (b) task execution start time in order for the result of the task to be available in the completed task results cache when the result of the task will be used by the main process,
and the time limit is measured in one of time units and instruction cycles.

6. The parallel computing method of claim 1 wherein, for at least one identified task, the probability that the task result will be needed by the main process is assigned further based on a parameter value of the executing main process.

7. The parallel computing method of claim 1 further comprising:
   removing from the completed task results cache the result of any task for which the probability that the task result will be needed by the main process is zero.

8. The parallel computing method of claim 1 wherein the main process comprises a transportation network simulation process and the tasks include trip planning tasks for individual vehicles or travelers.

9. A non-transitory storage medium storing instructions executable by a parallel computing system comprising a plurality of central processing units (CPUs) to perform a parallel computing method comprising:
   executing a main process;
   while executing the main process, executing a task priority queue update process to maintain a task priority queue that, for a current execution point in the main process, ranks tasks whose results will be needed with non-zero probability by the main process at an execution point in the main process that is later than the current execution point; and
   executing tasks in parallel with the executing of the main process on CPUs not used in executing the main process and with the executing of tasks being initiated in accordance with the task priority queue, the executing of tasks including storing results of completed tasks in a completed task results cache;
   wherein the task priority queue update process includes:
      from vantage point of the current execution point in the main process, identifying the tasks whose results will be needed with non-zero probability by the main process,
      for each identified task, assigning a probability that the task result will be needed by the main process based on the current execution point in the main process, a time limit for the task relative to the current execution point in the main process, and a score for the task that is computed based on the probability and time limit, and
      ranking the identified tasks in the task priority queue in accordance with the assigned scores; and
   wherein the main process is configured to retrieve completed task results from the completed task results cache when needed by the main process.

10. The non-transitory storage medium of claim 9 wherein the executing of tasks comprises:
    (1) selecting the top-ranked task in the task priority queue that is suspended or not yet started;
    (2) executing the selected task on an idle CPU if an idle CPU is available;
    (3) if no idle CPU is available, and if a task is identified that is of lower rank in the task priority queue than the selected task and that is currently executing on a working CPU, pre-empting execution of the identified task and executing the selected task on the working CPU; and
    repeating the operations (1), (2), and (3) for each next-highest-ranked task in the task priority queue until a task is selected in operation (1) that is not executed in operation (2) and is not executed in operation (3).

11. The non-transitory storage medium of claim 9 wherein the parallel computing method further comprises:
    removing from the completed task results cache the result of any task for which, from the vantage point of the current execution point in the main process, the probability that the task result will be needed by the main process is zero.

12. The non-transitory storage medium of claim 9 wherein the main process comprises a main simulation process and the tasks include micro-simulations whose results are used by the main simulation process.

13. The non-transitory storage medium of claim 12 wherein the main simulation process comprises a transportation network simulation process and the micro-simulations include trip simulations for individual vehicles or travelers.

14. An electronic data processing system comprising:
    a non-transitory storage medium as set forth in claim 9; and
    a parallel computing system comprising a plurality of central processing units (CPUs), the parallel computing system operatively connected with the non-transitory storage medium to read and execute the instructions stored on the non-transitory storage medium.

15. A parallel computing method performed by a parallel computing system comprising a plurality of central processing units (CPUs), the parallel computing method comprising:
    executing a main process;
    executing tasks in parallel with the main process on CPUs not used in executing the main process, and storing results of completed tasks in a completed task results cache from which the main process retrieves completed task results when needed by the main process;
    in executing tasks, controlling the initiation of task execution in accord with a task priority queue that ranks tasks for a current execution point whose results will be needed with non-zero probability by the main process; and
    updating the task priority queue with advancement of the current execution point as the main process executes wherein the updating includes:
       identifying the tasks whose results will be needed with non-zero probability by the main process based on the current execution point in the main process,
       for each identified task, assigning a probability that the task result will be needed by the main process based on the current execution point in the main process, a time limit for the task relative to the current execution point in the main process, and a score for the task that is computed based on the probability and time limit, and ranking the identified tasks in the task priority queue in accordance with the assigned scores.

16. The parallel computing method of claim 15 wherein controlling the initiation of task execution includes:
pre-empting an executing task by a task having higher priority in the priority ranking of tasks if no idle CPU is available for initiation of execution of the task having higher priority in the priority ranking of tasks.

17. The parallel computing method of claim 15 further comprising:
removing the result of a completed task from the completed task results cache in response to the probability going to zero that the result of the completed task will be needed by the main process as the priority ranking is updated with advancement of the current execution point.

18. The parallel computing method of claim 15 wherein the main process comprises a main simulation process and the tasks include micro-simulations whose results are used by the main simulation process.

* * * * *